United States Patent [19]
Suda et al.

[11] Patent Number: 5,897,646
[45] Date of Patent: *Apr. 27, 1999

[54] SYSTEM AND METHOD FOR LANGUAGE INFORMATION PROCESSING FOR PROVIDING KNOWLEDGE OF LANGUAGE REQUESTED BY THE USER

[75] Inventors: Aruna Rohra Suda; Suresh Jeyachandran, both of Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/552,920

[22] Filed: Nov. 3, 1995

[30] Foreign Application Priority Data

Nov. 8, 1994 [JP] Japan .................................. 6-273613

[51] Int. Cl.⁶ ............................. G06F 15/18; G09B 19/06
[52] U.S. Cl. ............................ 707/530; 707/517; 706/11; 706/47; 434/156
[58] Field of Search .................................... 395/768, 767, 395/769, 759, 352, 353; 707/500, 530, 531, 536; 704/1, 8, 9; 434/156, 157; 706/45, 47, 11

[56] References Cited

U.S. PATENT DOCUMENTS

| | | | |
|---|---|---|---|
| 5,043,891 | 8/1991 | Goldstein et al. | 707/531 |
| 5,191,613 | 3/1993 | Graziano et al. | 380/25 |
| 5,282,265 | 1/1994 | Suda et al. | 395/12 |
| 5,302,969 | 4/1994 | Kuroda et al. | 345/168 |
| 5,341,469 | 8/1994 | Rossberg et al. | 707/514 |
| 5,446,653 | 8/1995 | Miller et al. | 395/204 |
| 5,528,491 | 6/1996 | Kuno et al. | 395/759 |
| 5,555,408 | 9/1996 | Fujisawa et al. | 395/600 |
| 5,608,857 | 3/1997 | Ikeo et al. | 707/500 |
| 5,613,131 | 3/1997 | Moss et al. | 707/509 |
| 5,682,538 | 10/1997 | Lemire et al. | 395/148 |
| 5,802,504 | 9/1998 | Suda et al. | 706/11 |
| 5,810,599 | 9/1998 | Bishop | 434/157 |
| 5,835,922 | 11/1998 | Shima et al. | 707/522 |

FOREIGN PATENT DOCUMENTS

| | | |
|---|---|---|
| 0241646 | 10/1987 | European Pat. Off. . |
| 0361366 | 4/1990 | European Pat. Off. . |

*Primary Examiner*—Joseph H. Feild
*Attorney, Agent, or Firm*—Fitzpatrick, Cella, Harper & Scinto

[57] ABSTRACT

A language information processing system includes a device for inputting a document preparation aid command including the kind of document to be prepared, a knowledge base having knowledge for document preparation is searched in accordance with the input command to determine a document preparation rule corresponding to the document to be prepared, the document preparation rule determined being converted to a form that can be understood by the user before it is output, thereby assisting the user in the preparation of a document or the learning of a language.

12 Claims, 17 Drawing Sheets

What would you like to know ?

(a) A brief overview of 'how to write business letters'
(b) Layout/Format of business letters
(c) Introduction
(d) Main Body
(e) Closing Paragraph
(f) Closing Enter your choice :

FIG. 5

Dr. John Smith
Professor
Department of Computer Science
Duke University
Durham, NC-12432
USA                                    March 15, 1993

Dear Dr. Smith,

> Introduction

> Main Body

> Closing Paragraph

Yours Sincerely, (Aruna Rohra)

Please choose from the following :

1. Receiver is a Known Person
2. Receiver is an Unknown Person

Enter Your Choice :

FIG. 7

Rule 1 : Overall Layout-
    Block A : Receiver's name & address
    Block B : Date
    Block C : Salutation
    Block D : Introduction
    Block E : Main Body
    Block F : Closing Paragraph
    Block G : Closing Remark & Signature Rule 2 : Receiver's name & address at top left.
Rule 3 : Date (i.e., today/date of sending) - Right align
Rule 4 : Salutation
    (a) if the Receiver is Known Person
        then if well known and same level
            then address with First Name
        else see Rule 4 (b)
    (b) if Receiver is a Doctorate/Professor
        then use 'Dear Dr./Prof.' respectively
        else use either Mr.<surname> or Ms.<surname>

Rule 5 : Introduction - see 'Introduction' rules
Rule 6 : Main Body - see 'Main Body' rules
Rule 7 : Closing Paragraph - see 'Closing Paragraph' rules
Rule 8 : Closing Remark
    For e.g., 'yours sincerely'
    followed by signature below with your full name in braces below
    the signature as shown below :

yours sincerely (Aruna Rohra)

FIG. 8

Salutation

If well known and same level
then address by First Name
  e.g., Dear John, else if he/she is a Doctorate/Professor
  then use 'Dear Dr./Prof.' respectively
   e.g., Dear Prof. Smith, eise use either Mr.<surname> or Ms.<surname>
   e.g., Dear Ms. Igarashi, Please choose from the following :

1. First time letter
2. Reminder letter
3. Reply letter
4. Thank you letter

Enter Your Choice :

FIG. 10

1) If First time Letter and Unknown receiver
   then state your work as close to his/her work as possible, including the relation to his/her work.
   For example, if you are working on 'Cognitive Science' using the theories of the receiver then it
         is preferable to start the letter with the following sentence :
   'I am working on Cognitive Science using your theory of learning.'

2) If it is First time Letter and known receiver
   (a) if Last corresponded is more than 1 year
      then add the following :
      * Fixed sentence
         'Long time since I last communicated with you'
      * If work changed in the meantime then mention current work
         e.g., 'In the meantime, I have, however started working on ICE which we are hoping to start
            from next year.' (or)
            'I have as a matter of fact, started working on something new and i.e., 'Educating the
            masses'. Changing the field has kept me busy for the past few years.'
      else could also add 'I am still working on ...'
      * Enquire about receiver's work
         e.g., 'I hope your work is going well' (or)
            'I do hope that all has been well at your end.'
   (b) if Last corresponded is less than 1 year but greater
      than 3 months then add the following
      * 'It is some time since I last wrote to you'

3) If Reminder Letter
   (a) Get details of when the letter was sent
      * 'I had sent you a letter on 27th April'
      ...

4) If Not First time Letter (a) Get details of mode of communication, date of receipt, date of sending ...

* if date of receipt is more than 2 weeks+date of sending
         'This is with reference to your letter dated ..., which I received only on ...'
      * if mode is fax, suppress mention of date of receipt
      * if replying 2 Weeks after date of receipt
         'Sorry for the delay in replying to it'
      * if reply received within 2 Weeks of the letter sent
         'Thank you for your quick response'

5) Then state the purpose (main goal) of the letter
   For example, in case of a letter for fix appointment to visit him/her to discuss you r work with
         him/her then it is important to mention the main purpose in the introduction paragraph.
      e.g., 'I would like to have an opportunity to discuss about Interprocess Communication with you'

FIG. 11

Introduction for First time letter (Known Receiver)

1 (a) if Last corresponded is more than 1 year
   then include the following :
      'Long time since I last communicated with you'
   If work has changed in the meantime
   then mention current work
      e.g., 'In the meantime, I have, however started working on
         ICE which we are hoping to start from next year.' (or)
         'I have as a matter of fact, started working on something
         new and i.e., 'Educating the masses'. Changing the
         field has kept me busy for the past few years.'
   else could also add
      'I am still working on...'
   Also, Enquire about receiver's work
      e.g., 'I hope your work is going well' (or)
         'I do hope that all has been well at your end.'

(b) if Last corresponded is less than 1 year but greater
      than 3 months then add the following
      * 'It is some time since I last wrote to you'

2 Then state the purpose (main goal) of the letter.
   For example,
      in case of a letter for fix appointment to visit him/her to discuss you r work
      with him/her then it is important to mention the main purpose in the
      introduction paragraph.

e.g., 'I would like to have an opportunity to discuss about Interprocess
         Communication with you'

FIG. 12

1) State the main plan i.e., how the proposed main goal (mentioned in 'Introduction') is proposed to be satisified.

2) State any preconditions of the main plan

3) State other sub-goals, if any

4) State the Plan (s) and Precondition (s) of other parts of Main goal

5) Add any other information ; which may be necessary

If you would like more details/examples on any of the above enter the appropriate number Enter your choice

FIG. 13

1) State the main plan
   * State the plan of how the main goal (mentioned in the 'Introduction') is proposed to be satisfied
   + Add Reason
   It is essential that the context be described to the other party.
   For e.g., in case of letters requesting appointment for visits;
      it is customary to include the reason for scheduling this visit
   e.g.,
      'As I shall be coming to <vicinity> to attend
      AAAI Annual Meeting in April, I would like
      to take this opportunity to meet you, if possible.'
   (or)
      'It so happens that I am coming ... and shall
      be grateful if I could visit you on ...'

2) State any preconditions of the main plan
   For example, getting appointment is precondition for visit 3) State other sub-goals, if any
   e.g., 'I would also like to see your labs and facilities.'

4) State Plan (s) and Precondition (s) of other parts of Main goal
   In case of letters of 'visit' :
   e.g., - 'Kindly arrange for my accommodation'
         - 'Is prepayment or some sort of advance money
            required for the above.'

5) Any other information, which may be necessary

FIG. 14

Statement of the main plan

State the plan of how the main goal (mentioned in the 'Introduction') is proposed to be satisfied.
It is essential that the context be described to the other party.

For e.g., in case of letters requesting appointmant for visits;
    it is common courtesy to include the reason for scheduling this visit e.g.,
  As I shall be coming to <vicinity> to attend
  AAAI Annual Meeting in April, I would like
  to take this opportunity to meet you, if possible.'
(or)
  'It so happens that I am coming ... and shall
  be grateful if I could visit you on ...'

FIG. 15

CLOSING STATEMENT if (letter on behalf)
       * 'With best regards' if (first time-fix appointment letter)
      if (Unknown Receiver)
          * 'Looking forward to hearing from you'
      else
          * 'Looking forward to metting you' if (second time-confirming appointment letter)
      * 'Once again, looking forward to meeting you' if (request information letter)
      * 'Thanking you in advance' if (Reminder Letter)
      * 'Waiting to hearing from you' else
      * 'Thanking you'

FIG. 16

TEXT PREPARATION RULES FOR TECHNICAL REPORTS

1. Background (from previous reports/Work)
2. Aim (list main points from results)
3. Results (refine & make coherent the input given by user)
4. Conclusions/Summary (list point wise from above)
5. Appendices (if any mentioned in results or ask user)
6. References
7. Enclosures (if any mentioned in results or ask user)

FIG. 17

TEXT PREPARATION RULES FOR SOFTWARE USER MANUAL

Preface
Table of contents
List of figures

Introduction
- * What's in the package ? (features)
- * Hardware requirements
- * Software requrements
- * Unpacking (Disks)
- * Type faces (icons) used
- * How to contact us ? (Support services)

Installing
- * Procedure
- * Probable errors (Read this before you call us !)

Getting started
- * Feel of the system
- * A short tutorial
- * Basic features
  - * File Opening & Saving
  - * Editing
  - * Printing Advanced Features
- * Editing
  - * Search Operations - seach, replace words
  - * Block Operations - copy, move, delete blocks
  - * Selection of Fonts, Size,
  - * Page format
  - * Margin setting, tabs, line spacing
  - * Double column
  - * Header/Footer

- * Drawing
  - * Making boxes, shading
  - * Special symbols - mathematical,···

- * Spell checker
  - * Spelling scan/correction
  - * Updating user dictionary
  - * Thesaurus

- * Printing
  - * Page Preview
  - * Selecting/Installing Printers

- * Advanced operations
  - * Creating mailing labels
  - * Mail merging

Appendices
Error Messages
Index

SYSTEM AND METHOD FOR LANGUAGE INFORMATION PROCESSING FOR PROVIDING KNOWLEDGE OF LANGUAGE REQUESTED BY THE USER

BACKGROUND OF THE INVENTION

1. Field of the Invention

The present invention relates to a system for and a method of information processing for providing information necessary for document preparation, language learning, etc.

2. Description of the Related Art

There exist conventional systems capable of giving the user rough information in a specific field, such as document preparation. For example, for the preparation of a report, there exists a system which presents the principal entries of the report to be prepared, thereby informing the user of the outline of the report. For the preparation of a letter, there exists a system which enables the user to select the sections of the letter, such as the introduction, main body and closing statement, successively from a menu or the like in the order of the contents of the letter.

Of the above-mentioned conventional document preparation systems, the system for preparing a report presents entries but does not supply the user with the kind of contents to be written under each of the entries.

In the case of the preparation of a letter, the above system, which supplies the contents of each entry in the form of a selected paragraph, assists the user in the preparation of a letter by executing the preparation of the letter itself but is incapable of assisting the user in learning the procedures for preparing letters.

Further, it has been impossible for the above system to modify these paragraphs in conformity with particular needs, nor has it been capable of constructing a context.

SUMMARY OF THE INVENTION

It is an object of the present invention to provide a system which designates step by step the kind of contents to be written under each entry so that the user may be caused to actually prepare a document perfectly in conformity with his or her own requirements, thereby causing the user to learn how to prepare a document while instructing the user in document preparation.

Another object of the present invention is to provide a system which presents to the user a knowledge of language in accordance with situation.

According to one aspect, the present invention which achieves these objectives relates to a language information processing system comprising: input means for inputting a document preparation aid command including the kind of document to be prepared; a knowledge base having knowledge for document preparation; determining means for searching the knowledge base in accordance with the command input by the input means for the purpose of determining a document preparation rule corresponding to the document to be prepared; and output means for outputting the document preparation rule determined by the determining means.

According to another aspect, the present invention which achieves these objectives relates to a language information processing system comprising: input means for inputting information for requesting knowledge related to language; determining means for determining the situation regarding the input of information from the input means by referring to a situation knowledge base having knowledge related to situation; searching means for searching a language knowledge base having knowledge related to language; and output means for outputting knowledge related to language obtained as a result of searching by the searching means.

According to still another aspect, the present invention which achieves these objectives relates to a language information processing method comprising the steps of: an input step for inputting a document preparation aid command including the kind of document to be prepared; a determining step for searching a knowledge base having knowledge for document preparation to determine a document preparation rule corresponding to the document to be prepared; and an output step for outputting the document preparation rule determined by the determining step.

According to a further aspect, the present invention which achieves these objectives relates to a language information processing method comprising the steps of: an input step for inputting information for requesting knowledge related to language; a determining step for determining the situation related to the input of information in the input step by referring to a situation knowledge base having knowledge related to situation; a searching step for searching a language knowledge base having knowledge related to language on the basis of the situation determined by the determining step and the information input by the input step; and an output step for outputting the knowledge related to language obtained as a result of the searching by the searching step.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a diagram showing a sample of business letter;

FIG. 7 is a diagram showing a rule for layout;

FIG. 8 is a diagram showing an example of a rule for salutation;

FIG. 10 is a diagram showing a rule for introduction;

FIG. 11 is a diagram showing a rule for introduction in the case of a known receiver;

FIG. 12 is a diagram showing preparation procedures;

FIG. 13 is a diagram showing an example of a rule for the main body;

FIG. 14 is a diagram showing an example of rule display;

FIG. 15 is a diagram showing a rule for closing statement;

FIG. 16 is a diagram showing an example of rules for technical report preparation; and FIG. 17 is a diagram showing an example of rules for preparing manuals.

DETAILED DESCRIPTION OF THE PREFERRED EMBODIMENTS

A preferred embodiment of the present invention will now be described in detail with reference to the accompanying drawings.

In the following, an embodiment of the present invention will be described in detail with reference to the drawings.

Figure 1:
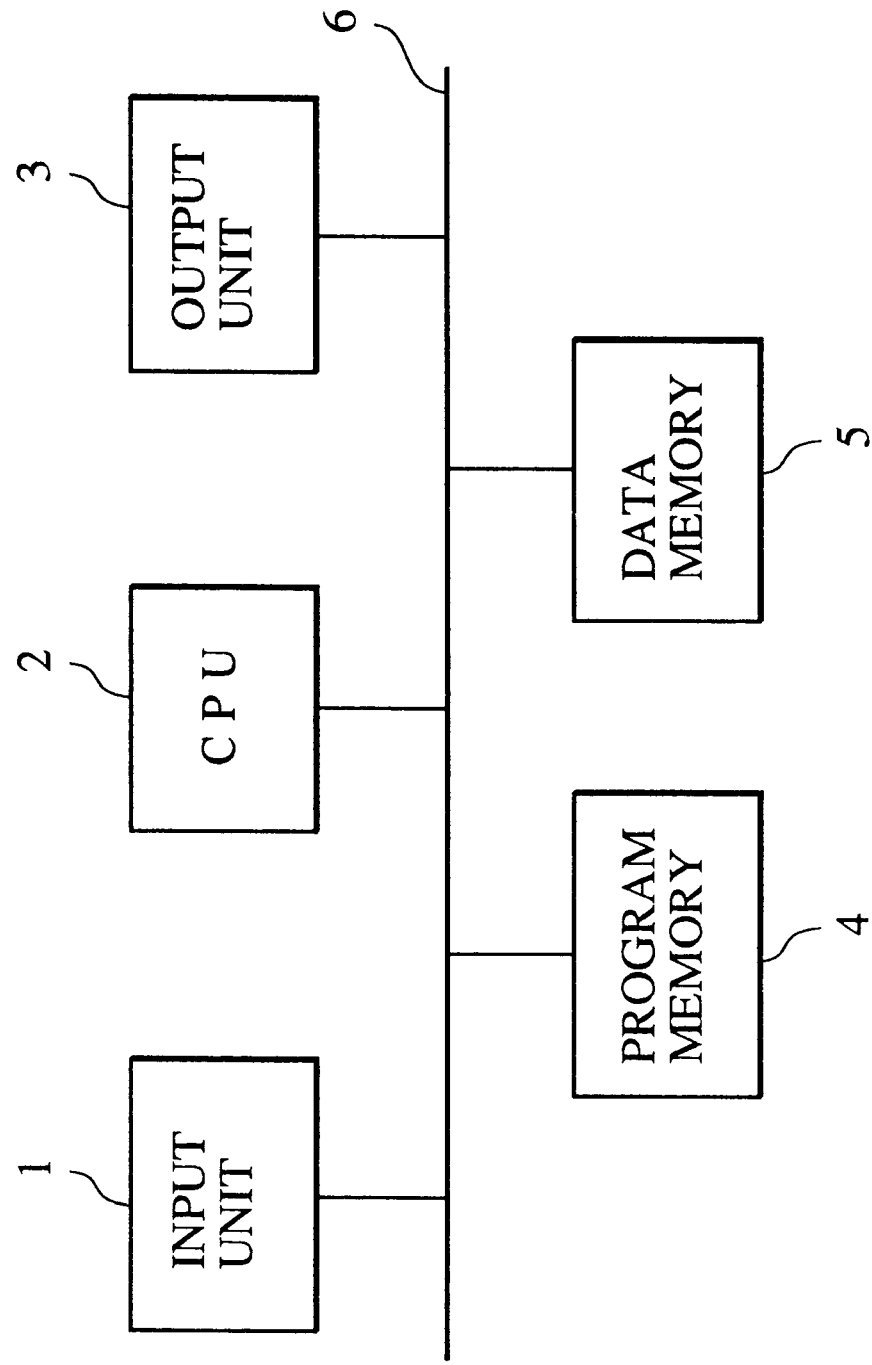
FIG. 1 is a block diagram showing the hardware construction of a document processing apparatus according to an embodiment of the present invention.

FIG. 1 is a block diagram showing the hardware construction of a document processing apparatus according to an embodiment of the present invention, which is equipped with an input section 1, a CPU 2, an output section 3, a program memory 4, a data memory 5, and a bus 6.

In the drawing, the input section 1 is a unit for inputting information and consists, for example, of a keyboard for inputting characters, selection commands, etc. through manipulation of keys. However, the unit is not restricted to that; it may also consist of a mouse for indicating positions on display, a voice input device including a voice recognition system, an image input device including a character recognition system, a receiving device for receiving information from other apparatus, etc. It is also possible to provide two or more of the above-mentioned devices for selective use. Further, the input information may be one generated through some other processing performed in this apparatus.

The CPU 2 executes computation for various processings, logical judgment, etc., and controls the various components connected to the bus 6.

The output section 3 consists of a display device, such as a CRT or a liquid crystal display. It may also be a voice output device for outputting information that has undergone voice synthesis, a printer for outputting in print, a transmission device for transmitting information to other apparatus, etc. It is possible to provide two or more of these devices for selective use. Further, the output information may be used as input information for some other processing performed in this apparatus.

The program memory 4 is a memory for storing programs for control by the CPU 2, including processing procedures to be described below with reference to a flowchart. The program memory 4 may consist of a ROM or a RAM into which programs are loaded from external storage devices or the like.

The data memory 5 stores data generated through various processings. Further, it stores the knowledge of a knowledge base described below. The data memory 5 consists, for example, of a RAM. The knowledge of the knowledge base is loaded from a non-volatile external storage medium prior to the processing or is referred to each time it is required.

The bus 6 is used for the transfer of an address signal for designating a component to be used as the object of control of the CPU 1, a control signal for controlling each component, and data to be mutually exchanged between the components.

Figure 2:
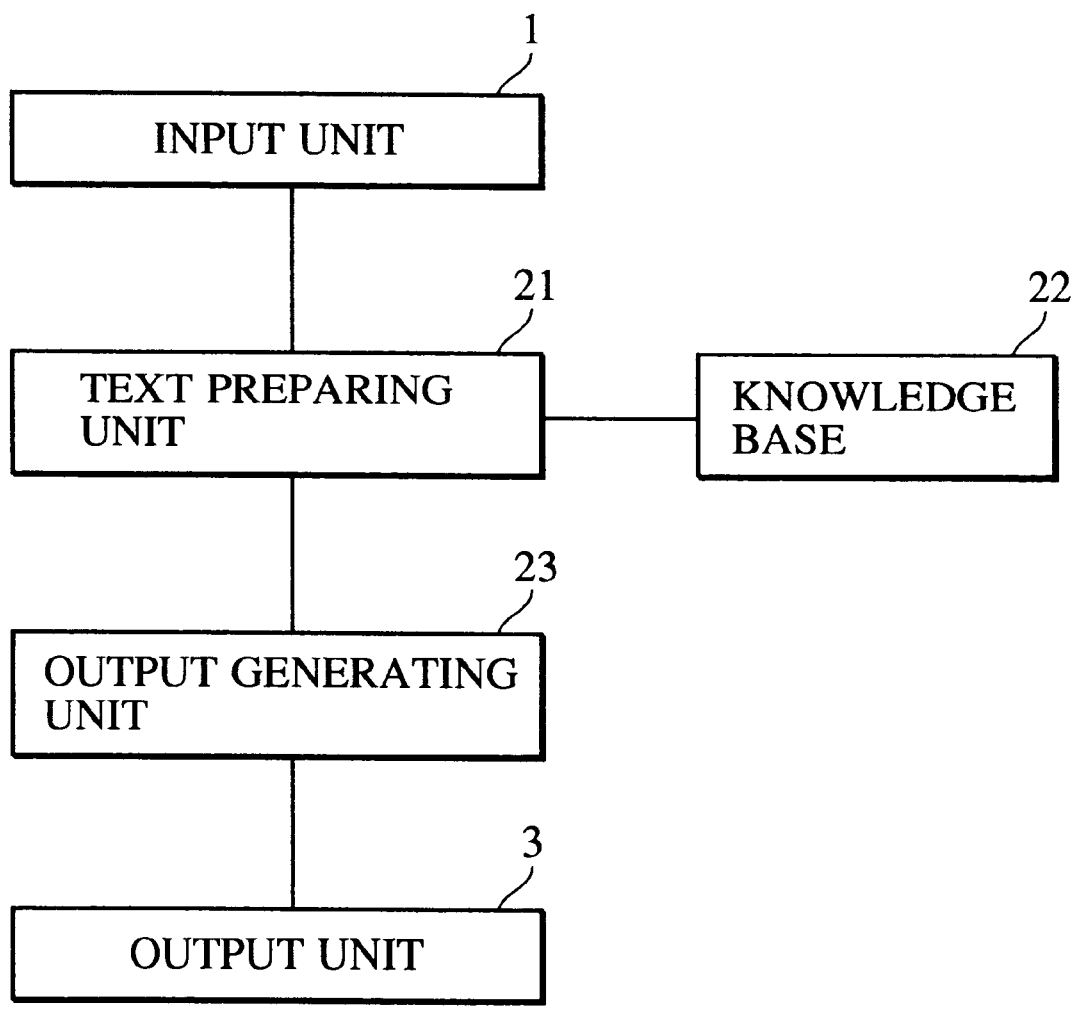
FIG. 2 is a block diagram showing the functional construction of the document processing apparatus.

FIG. 2 is a functional block diagram showing the basic construction of a document processing apparatus according to an embodiment of the present invention.

In the drawing, the kind of document about which the user wishes to learn the writing method and a command for the learning are input from the input section 1. A text preparing section 21 refers to a knowledge base 22 on the basis of the kind of document input from the input section 1, and prepares information on the contents of the document to be prepared and the preparation procedures thereof. The knowledge base 22 has information on the contents and the preparation procedures in connection with the kind of document. An output generating section 23 converts the information prepared by the text preparing section 21 into a predetermined writing form that can be understood by the user, for example, a natural language. The information generated by the output generating section 23 is output to the output section 3 and made available for the user.

In the above-described apparatus, the user can see each of the rules for document preparation provided in the apparatus. Further, this apparatus is not intended for the actual preparation of documents but for the training of the user in the rules required when the user himself is to prepare a document. Further, upon request from the user, this apparatus outputs a sample text regarding each of the rules.

For example, when a command for instructing how to write a letter is issued, the system obtains various parameters through interaction with the user and refers to the knowledge base to thereby teach the outline of a letter to the user.

After this, when the user asks for detailed information, for example, information as to how to write the introduction of a letter when the user has changed his or her occupation after the last communication with the receiver of the letter, the rule that the change of occupation should be stated clearly is given. Further, when, for example, the user is writing a letter to a person in the United States whom he is going to visit, and wishes to know whether he may write about or make an inquiry as to the propriety of his taking some small present when calling on that person, the system, which serves as a source of the knowledge of an expert in letter writing, provides the requisite cultural and social background knowledge in connection with such matters, and gives an explanation of such knowledge. In this way, the system is capable of instructing the user not only in the writing of a particular letter that he or she is actually writing, but also in letter writing in general.

The above-described output can be made more specific in response to questions from the user. For example, in the preparation of a letter, an answer to a question regarding propriety/impropriety of style is output.

To be able to answer such questions, the knowledge base 22 is further equipped with knowledge for coping with such situations. The text preparing section 21 selects appropriate knowledge therefrom, and outputs it to the output generating section 23. This knowledge may be in the form of a rule or of a descriptive nature.

In the following, the system will be described with reference to a specific example.

Figure 3:
FIG. 3 is a diagram showing an initial menu screen of a system for instructing letter preparation procedures.

FIG. 3 shows an initial menu screen in a system for instructing the user in the procedures for preparing a letter. The user selects one of the entries (a) through (f) in the drawing. In this way, the user selects from roughly classified categories regarding information on the theme he or she wishes to obtain. In particular, the entry (a) provides an outline of "how to write business letters", and supplies a brief explanation of the entire system for the beginner. Here, it will be assumed that the entry (b), "Layout/format of business letters", is selected.

Figure 4:
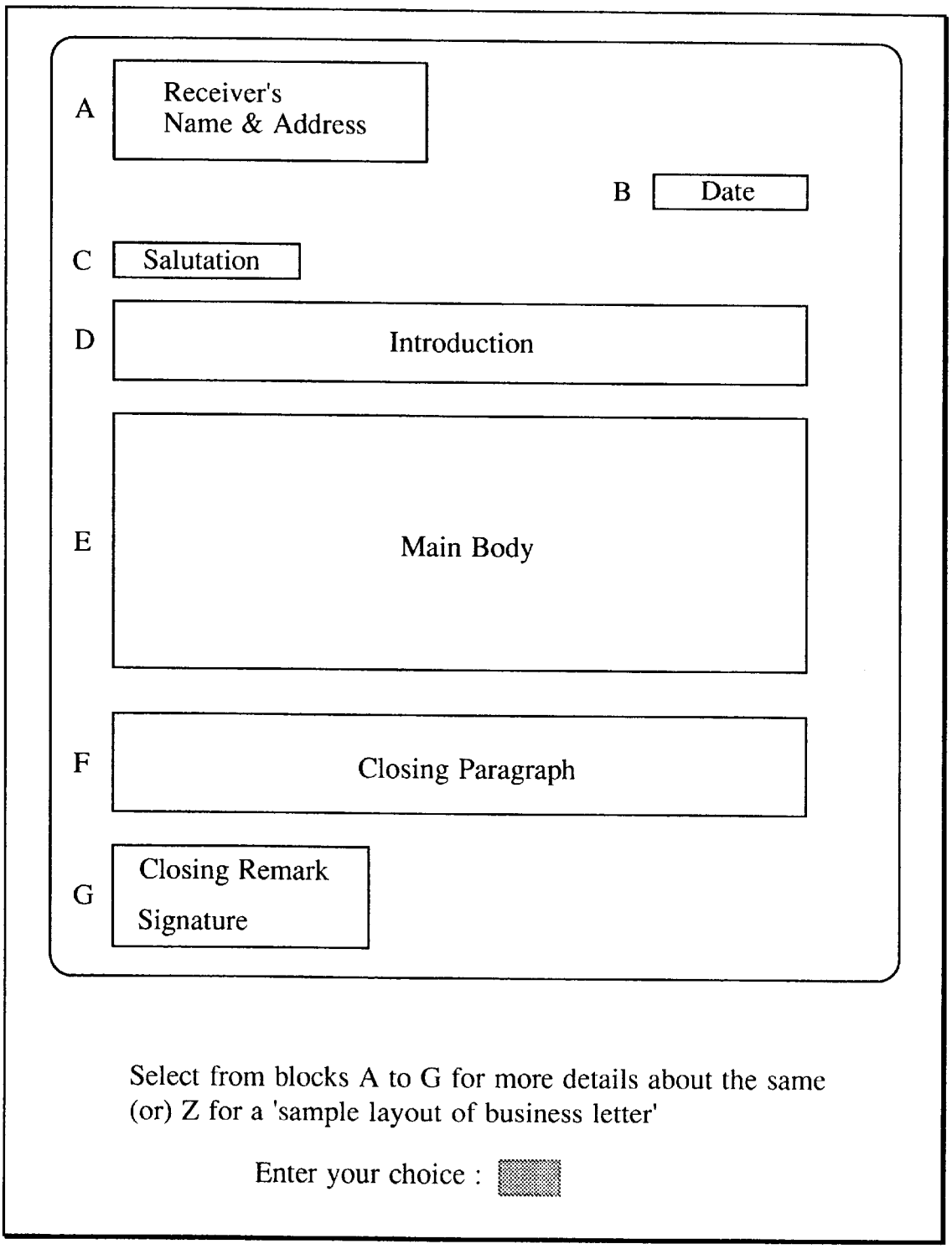
FIG. 4 is a diagram showing the layout of a business letter.

When the entry (b) is selected in FIG. 3, the screen as shown in FIG. 4 is displayed. FIG. 4 is a chart showing the layout of a business letter. Displaying such a layout enables the user to learn what to write, and in what order and where, as the contents of a letter.

As shown at the bottom of the screen of FIG. 4, a message is displayed to the effect that when blocks A through G are selected, details on the corresponding sections A through G will be given, and that when block Z is selected, a sample corresponding to the letter of FIG. 4 will be displayed, thus prompting the user to a next input operation.

FIG. 5 shows a sample of business letter displayed when block Z (sample) is selected in FIG. 4. In FIG. 5, a letter is displayed in which the dates, address, etc. are given in the form of specific examples.

Figure 6:
FIG. 6 is a diagram showing a selection screen.

Further, assuming, for example, that block C (salutation) is selected, the selection screen of FIG. 6 is displayed. Here, the user selects 1 when the receiver is a known person and 2 when the receiver is unknown.

FIG. 7 shows an example of layout rules. Here, when, in the selection screen of FIG. 6, the user selects 1 (which corresponds to the case in which the receiver is known), Rule 4 of FIG. 7 applies. Thus, on the basis of the rule of FIG. 7, a salutation rule as shown in FIG. 8 is prepared and displayed. When 2 (which corresponds to the case in which the receiver is unknown) is selected in FIG. 6, a rule in a similar form is displayed.

In this way, due to a display in the form of rules, the user can learn what to write in such and such cases. After this display, the user can return to the layout of FIG. 4 to select another section or return to the initial menu of FIG. 3.

Figure 9:
FIG. 9 is a diagram showing an example of a menu for introduction.

Next, a case in which block D (introduction) is selected from the layout of FIG. 4 will be described. In this case, the menu of FIG. 9 is displayed. FIG. 9 is presented on the assumption that any letter can be classified according to its natures as follows: 1 (first time letter), 2 (reminder letter), 3 (reply letter), and 4 (thank you letter).

When the user selects category 1 (first letter), FIG. 6 is displayed if the selection in FIG. 4 as to whether the receiver is known or unknown has not been made yet. When the selection has already been made, rules regarding introduction are displayed. FIG. 10 shows general rules regarding the introduction. Assuming that the letter is a "first time letter" and that the receiver is a known person, the rules as shown in FIG. 11 are displayed as corresponding rules regarding the introduction.

Also, in the case in which selection is made from the other categories 2~4, rules in a form similar to that of FIG. 11 are displayed on the basis of the rules of FIG. 10. However, in the case of the categories 2~4, the receiver is a known person, so that the selection in FIG. 4 is omitted. After this, the user may return to the layout of FIG. 4 or select another section, or return to the initial menu of FIG. 3.

Next, a case in which block E (main body) is selected will be described. In this case, the principal points and constructions regarding what to state in the main body are displayed as procedures in the order of statement. FIG. 13 shows rules on which the display of FIG. 12 is based. In FIG. 12, the user selects a point on which he or she requires further explanation or of which he or she desires a specific example. For example, when the user needs more information regarding the point of "State any preconditions of the main plan", pertinent rules are extracted from the rules of FIG. 13, and displayed in the way as shown, for example, in FIG. 14. When some other point is selected, an explanation or example is similarly output to the user.

FIG. 15 shows rules regarding the "closing statement". Further, FIG. 16 shows rules for preparing technical reports, and FIG. 17 shows rules for preparing manuals.

While the above embodiment has been described with reference to a system in which knowledge regarding document preparation is provided in a knowledge base to assist the user in the preparation of a document, it is also possible to form a system which aids the user in the learning of a language as follows: in a system having knowledge on general common sense in a knowledge base, a command or the like for requesting knowledge regarding a language is input, and information regarding the situation related to the input of the command, for example, information as to whether the user who has input the command is a native speaker of that language or a beginner who has only started learning it or as to for what purpose the information is to be used, is determined by referring to the general common knowledge in the knowledge base, and, on the basis of the situation thus determined and the input command, the knowledge related to language in the knowledge base is searched, and the knowledge obtained as a result of the search is output to the user.

As described above, in accordance with this embodiment, it is possible to assist the user in the preparation of a document, the learning of a language, etc. In particular, the user can learn the document preparing procedures while actually preparing a document. Further, various rules are presented in such a way as to enable the user to select from them, thereby making it possible for the system to serve as a guide in selecting the elements to be incorporated in the document.

Further, regarding rules for text preparation, it is possible to present a text sample in conformity with the requirement of the user, which facilitates the understanding for the user learning document preparing procedures.

Further, the texts to be output to the user are stored as templates, so that the load of generating natural language with respect to those portions can be omitted.

The present invention, described above, is applicable not only to a system composed of a plurality of computers but also to a particular computer in the system. Further, the present invention is applicable to a case to be achieved through the execution of a program by this computer. This program may be supplied from an external storage medium, and the storage medium storing this program is also within the scope of the present invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A language information processing system comprising:
   input means for inputting a document preparation aid command including the kind of document to be prepared;
   a knowledge base having knowledge for document preparation;
   determining means for searching said knowledge base in accordance with the command input by said input means to determine a document preparation rule corresponding to the document to be prepared and including a condition unspecified by a user and a subject to be described in the document on the condition; and
   first display means for displaying the document preparation rule determined by said determining means.

2. A language information processing system according to claim 1, further comprising second display means for outputting a text sample prepared on the basis of the document preparation rule displayed by said first display means.

3. A language information processing system according to claim 1, wherein said input means comprises:

menu display means for displaying a plurality of choices as a menu; and selection means for selecting one choice from said menu display means.

4. A language information processing system according to claim 1, wherein the document preparation aid command further includes a command for specifying a part of document to be prepared.

5. A language learning system for aiding a user in learning a language comprising:

input means for inputting a request for knowledge to aid the user in learning a language by a user who desires to learn a language;

determining means for determining user's situation for learning a language when the user inputs the request from said input means by referring to a knowledge base having knowledge related to the user and learning of a language;

searching means for searching for knowledge to aid the user in learning a language in a language knowledge base having knowledge related to language and knowledge to aid the user in learning a language on the basis of user's situation for learning a language determined by said determining means and the request input by said input means; and display means for displaying knowledge to aid the user in learning a language obtained as a result of the searching by said searching means.

6. A language learning system according to claim 5, wherein user's situation for learning a language when the user inputs the request includes an ability of the user for understanding the language.

7. A language information processing method comprising:

an input step for inputting a document preparation aid command including the kind of document to be prepared;

a determining step for searching a knowledge base having knowledge for document preparation to determine a document preparation rule corresponding to the document to be prepared and including a condition unspecified by a user and a subject to be described in the document on the condition; and a first display step for displaying the document preparation rule determined by said determining step.

8. A language information processing method according to claim 7, further comprising a second display step for displaying, with regard to the document preparation rule displayed by said first display step, a text sample prepared on the basis of the document preparation rule.

9. A language information processing method according to claim 7, wherein said input step comprises the steps of:

a menu display step for displaying a plurality of choices as a menu; and a selection step for selecting one choice from said menu display means.

10. A language information processing method according to claim 7, wherein the document preparation aid command further includes a command for specifying a part of document to be prepared.

11. A language learning method for aiding a user in learning a language comprising the steps of:

an input step for inputting a request for knowledge to aid the user in learning a language from a user who desires to learn a language;

a determining step for determining user's situation for learning a language when the user inputs the request in said input step by referring to a knowledge base having knowledge related to the user and learning of a language;

a searching step for searching for knowledge to aid the user in learning a language in a language knowledge base having knowledge related to language and knowledge to aid the user in learning a language on the basis of user's situation for learning a language determined by said determining step and the request input by said input step; and a display step for displaying the knowledge to aid the user in learning a language obtained as a result of the searching by said searching step.

12. A language learning method according to claim 11, wherein user's situation for learning a language when the user inputs the request includes an ability of the user for understanding the language.

\* \* \* \* \*

UNITED STATES PATENT AND TRADEMARK OFFICE
CERTIFICATE OF CORRECTION

PATENT NO. : 5,897,646

DATED : April 27, 1999

INVENTOR(S): ARUNA ROHRA SUDA, ET AL.

It is certified that error appears in the above-identified patent and that said Letters Patent is hereby corrected as shown below:

SHEET 10 OF THE DRAWINGS

In FIG. 10, line 2, "reiation" should read --relation--.
In FIG. 10, line 36, "you r" should read --your--.

SHEET 11 OF THE DRAWINGS

In FIG. 11, line 22, "you r" should read --your--.

SHEET 15 OF THE DRAWINGS

In FIG. 15, line 8, "metting" should read --meeting--.

UNITED STATES PATENT AND TRADEMARK OFFICE
CERTIFICATE OF CORRECTION

PATENT NO. : 5,897,646

DATED : April 27, 1999

INVENTOR(S) : ARUNA ROHRA SUDA, ET AL.

It is certified that error appears in the above-identified patent and that said Letters Patent is hereby corrected as shown below:

<u>COLUMN 4</u>

```
Line 27, "he" should read --he or she--.
Line 28, "he" should read --he or she--.
Line 29, "his" should read --his or hers--.
```

Signed and Sealed this

Thirteenth Day of June, 2000

*Attest:*

Q. TODD DICKINSON

*Attesting Officer*    Director of Patents and Trademarks